July 19, 1966

C. C. RIPLEY 3,261,756

EMBOSSED CLADDING FUEL ELEMENT AND MANUFACTURING
PROCESS THEREFOR

Filed Jan. 28, 1965

INVENTOR.
CHARLES C. RIPLEY
BY
*Roland A. Anderson*
ATTORNEY

July 19, 1966 C. C. RIPLEY 3,261,756
EMBOSSED CLADDING FUEL ELEMENT AND MANUFACTURING
PROCESS THEREFOR
Filed Jan. 28, 1965 2 Sheets-Sheet 2

INVENTOR.
CHARLES C. RIPLEY
BY
ATTORNEY

— 
United States Patent Office 3,261,756
Patented July 19, 1966

3,261,756
EMBOSSED CLADDING FUEL ELEMENT AND MANUFACTURING PROCESS THEREFOR
Charles C. Ripley, San Jose, Calif., assignor to the United States of America as represented by the United States Atomic Energy Commission
Filed Jan. 28, 1965, Ser. No. 428,889
6 Claims. (Cl. 176—67)

The invention described herein was made in the course of, or under, Contract No. AT(04-3)-189, Project Agreement No. 29, with the United States Atomic Energy Commission.

This invention relates generally to nuclear reactor fuel elements and in particular to a manufacturing process for embossing the fuel element to create turbulence promoting protuberances along the surface thereof and the product.

In nuclear reactors, it is desirable to incorporate fuel elements having high heat transfer characteristics combined with low absorption of neutrons and of a configuration to prevent slumping of the fissile fuel within the fuel element during operation and after shut-down of the reactor.

Although turbulence promoting protuberances and surface roughening to achieve high heat transfer are common in the art, fuel elements having various turbulence promoting surface patterns and the methods of producing such configurations vary considerably and generally require numerous manufacturing steps. In particular, turbulence promoting devices of the prior art were either machined out of thick-walled tubing or formed under hydrostatic pressure around machined or stacked pellets of precompacted fissile fuel material. The machined thick-walled tubing not only impaired heat transfer from the fissile fuel to the reactor coolant because of generally low heat transfer coefficient of the thick-walled tubing, but also it reduced neutron economy by excessive absorption of neutrons due to the large volume of absorbent material introduced by such cladding. The use of hydrostatic pressure to form the cladding around the machined or stacked pellets of precompacted fissile fuel has the disadvantage of requiring large and expensive pressure vessels in addition to the extra steps of first compacting to a very high density the individual fuel pellets before forming the cladding. The additional step of machining or stacking the individual pellets further increases the cost of fuel element fabrication. The process of the present invention eliminates the many separate steps by embossing the fuel element and compacting the fissile fuel therein to its final density simultaneously in a single step.

It is therefore an object of this invention to provide a simplified manufacturing method for producing nuclear reactor fuel elements having turbulence promoting protuberances.

It is a further object of this invention to provide a manufacturing method of producing nuclear reactor fuel elements having turbulence promoting protuberances wherein relatively thin-walled cladding material may be used.

It is another object of this invention to provide a manufacturing method for producing a nuclear reactor fuel element wherein slumping of the fissile fuel is reduced.

It is yet another object of this invention to form turbulence promoting protuberances, compact the fuel and form the means for reducing slumping of the fuel in nuclear reactor fuel elements in one operation.

It is another object of this invention to provide an embossed fuel element having relatively thin cladding over all parts of the fuel.

Other and more particular objects of this invention will be manifest upon study of the following detailed description when taken together with the accompanying drawings, in which.

Basically, the process of this invention comprises first filling a thin-walled (approximately 8 mil or thicker) ductile metallic tubing of suitable high temperature nuclear reactor metallic cladding material such as Inconel, Incoloy, Zircaloy, other ductile alloy of iron or zirconium or the like, with a powdered or fine granular fissile fuel; second, compacting said fissile fuel to a medium density in the range of 75 to 87% of theoretical maximum density by vibratory or other means; and third, applying localized high pressure along linear paths as by forcing an orb or wheel-shaped male die against the fuel element such that the cladding is deformed downwardly into the fissile fuel material along a narrowly defined linear path whereby the cladding is embossed through displacement of the fissile fuel as the male die rolls over the surface of the fuel element. It is contemplated that the fissile fuel may correspond in composition to essentially any solid fissile fuel material known and used in the art. Metallic, ceramic, oxide, carbide, and all similar solid fissile fuels may be used. For the purposes of this invention it is required merely that such a fissile fuel be provided in a comminuted or powdered physical form in which the granules are sufficiently small or of a graded mixture of small granules that the fissile fuel be plastically deformable to serve as a deformable female die. The pressure of the rolling male die not only compresses the fissile fuel directly under its path, but also because of the fluid action of the powdered or granular fuel material when under such high local pressure, the adjacent cladding is caused to bulge out creating a raised area between the depressed areas or grooves. By virtue of this action the thin metallic cladding comes into intimate contact with the fuel material thus permitting maximum heat transfer. Moreover the fissile material beneath the depressed areas is selectively compressed to a higher density than that under raised areas whereby a matrix of intermeshing and intersecting linear regions of higher density, material is produced throughout the fuel element with regions of somewhat lesser density therebetween, i.e., under the raised portions. Such a matrix provides enhanced antislump properties as well as providing for accommodation to expansion of the fissile fuel at distributed regions within the element.

It should be noted that the contour of the surface of the rolling wheel-shaped male die may be established to create various groove forms of either rounded, flat, V-shaped, or other configuration.

Figure 1:
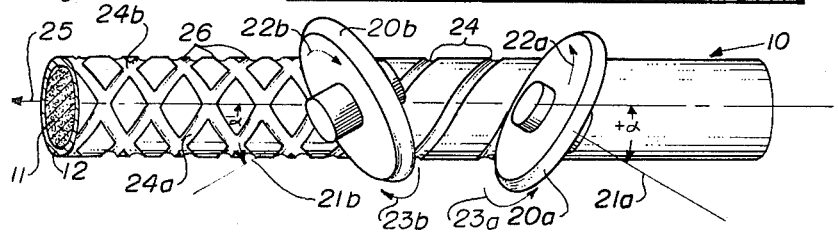
FIGURE 1 is a simplified illustration of a device for practicing the process of this invention.

FIGURE 1 is a simplified diagram illustrating a device employing the process of this invention. Basically the device comprises male die wheels 20a and 20b serially spaced longitudinally along fuel element 10 and rotatable about their axis 21a and 21b respectively, in the respective directions of arrows 22a and 22b. The male die wheels 20a and 20b, as well as their axis of rotation 21a and 21b, are also arranged by any suitable means (not shown) to counter-rotate about the longitudinal axis of fuel element 10 in the direction of arrows 23a and 23b respectively. In this simplified drawing only one male die wheel is shown for each of the counter rotating directions; however it can readily be seen that several male die wheels can be angularly spaced in the same plane as the die wheels shown around fuel element 10 to produce multiple sets of embossments or grooves.

To emboss the fuel element, male die wheel 20a is forced against fuel element 10 with sufficient pressure to form groove 24a. As male die wheel 20a rotates about the axis of fuel element 10 in the direction shown, it also rotates about its own axis 21a. Since axis 21a of male die wheel 20a is set at an angle $\alpha$ to the longitudinal axis of fuel element 10, said fuel element, which does not rotate, may be caused by other means (not shown) to advance in the direction of arrow 25. Thus groove 24a is generated in the form of a helix advancing in the present illustration in a counter-clockwise direction. Male die wheel 20b spaced apart from male die wheel 20a along the longitudinal axis of fuel element 10, is set at an angle $-\alpha$ to the longitudinal axis of said element 10 and is caused to rotate in the opposite direction indicated by arrow 23b from die wheel 20a. In a similar manner, as previously described for die wheel 20a, groove 24b is generated in fuel element 10 in the form of a helix advancing, in the present illustration, in a clockwise direction. Thus where the grooves cross, an embossed quilted pattern results having a raised portion 26.

Figure 7:
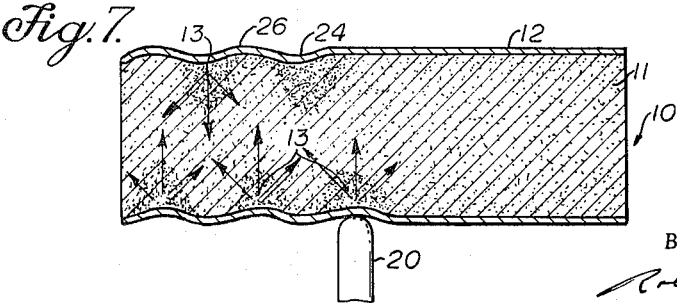
FIGURE 7 is a longitudinal section through a typical fuel element illustrating the compacting and anti-slumping effect produced by the process hereinafter disclosed.

More specific details as to the creation of the embossing can be best seen by referring to FIGURE 7. The force of male die wheel 20 against cladding 12 deforms the cladding which transmits the pressure to the moderately compacted fissile fuel 11 directly underneath. Due to fluid-like action, the powdered fuel tends to flow under compression in the direction of arrows 13 transmitting the compacting forces to the surrounding material. Aided by the outwardly exerted pressure of the fuel and a general resistance to bending, the cladding is caused to bulge, i.e., become embossed, as evidenced by raised portions 26. In general, however, there is produced a net decrease in the volume of the cladding and a net increase in the density of the fissile fuel. At the same time, it will be noted that due to the indentations in the fuel element cladding 12, there is created a multi locus support to prevent slumping, ratcheting or other longitudinal movement of the fuel upon reactor shut-down from contraction of the fuel upon cooling due to the inward protrusion of the cladding.

Figure 2:
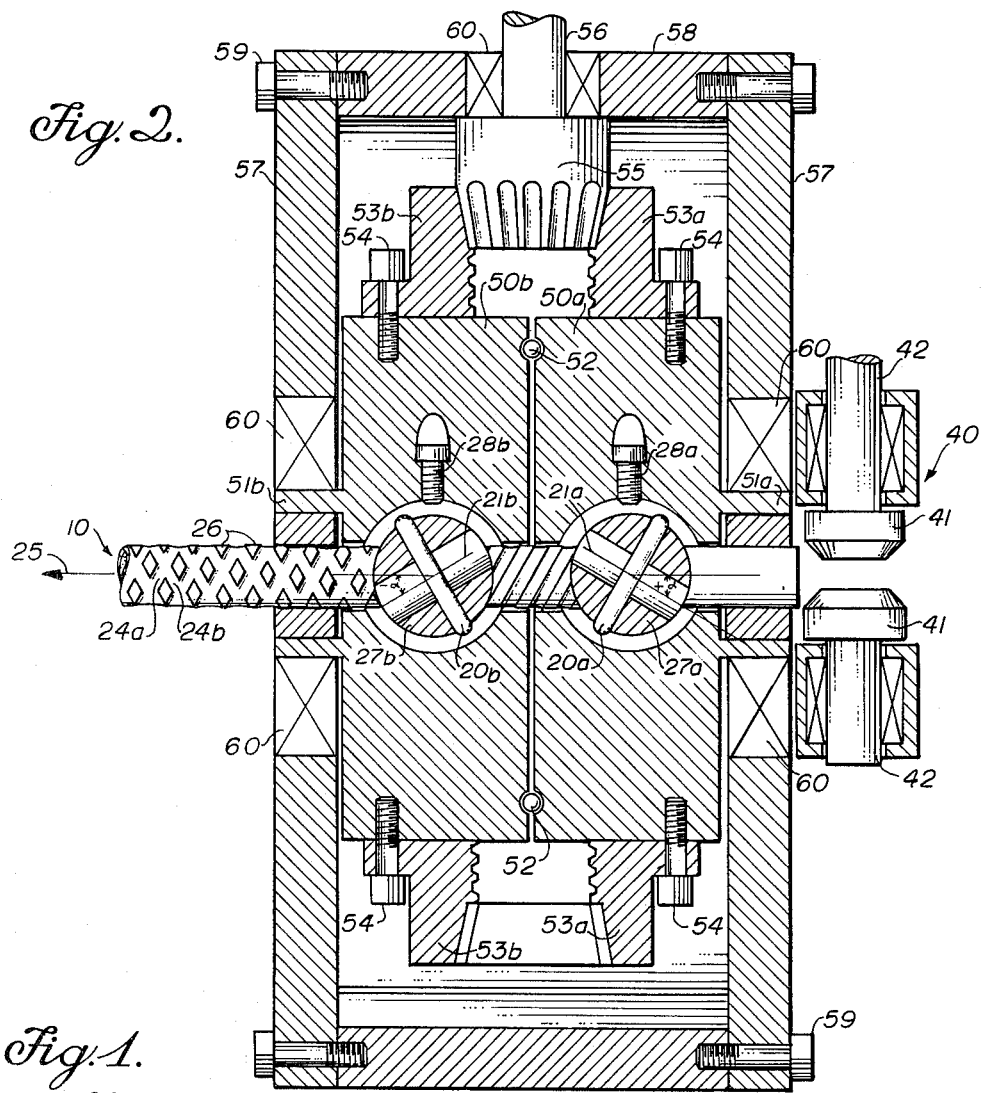
FIGURE 2 is a longitudinal section through a machine designed to operate the process of this invention and represents an elaboration of the scheme illustrated in FIGURE 1.

As an example of an assembled machine arranged to employ the process of this invention, FIGURE 2 is a longitudinal section through such a device. The embossing mechanism of the machine comprises two counter rotating die holders 50a and 50b provided with aligned axial bores and supported in parallel contiguity by axially aligned hollow axial shafts 51a, 51b, respectively, with thrust ball bearing means disposed in mating circular race grooves in the intermediate faces of the holders 50a and 50b. Each die holder 50a, 50b, is fabricated of a rigid material and is provided with perforations extending radially inwardly from the periphery at 90° spacings, to intersect the axial bore therein to provide for disposition of, in the present embodiment, four embossing dies. Other embodiments may include two, three, six or more embossing dies. More specifically, each male die wheel 20a, 20b, of holders 50a, 50b, respectively is mounted by means of a rotatably adjustable holder 27a, 27b respectively, is disposed in the radial perforations of the die holders 50a, 50b, whereby the die wheels project into the axial bores thereof. Set screws 28a, 28b, secure holders 27a, 27b, respectively, at any selected angular position to establish the pitch of said helical grooves. Holders 27a and 27b are also adjustable with respect to the centerline of the machine to control embossing depth.

The embossing mechanism is assembled in a structural framework including spaced parallel end plates 57 and top and bottom plates 58 fastened by means of bolts, studs or the like 59. End plates 57 are perforated to receive antifriction bearings in which shafts 51a, 51b, are rotatably disposed and which bearing may also serve as thrust bearings to maintain the intermediate faces of die holders 50a, 50b, in close proximity.

Peripheral ring gears 53a, 53b, are attached to die holders 50a, 50b, respectively, and are engaged by a pinion gear 55 supported by radially extending shaft 56 rotatably supported by an antifriction bearing 60, disposed in top plate 58 of the aforesaid framework. With such an arrangement, rotary power applied to shaft 56 from motor means (not shown) causes the ring gears 53a, 53b, and the attached die holders 50a, 50b, to rotate in opposite or counter rotating directions.

A fuel element to be embossed is inserted axially through axle shaft 51a to engage the first set of die wheels. The male die wheels rotate about fuel element 10 while fuel element 10 does not of itself rotate. Accordingly a positive fuel element advancing means 40 is provided comprising driving rollers 41 supported by shafts 42 rotatably mounted on end plate 57 to frictionally engage the surface of the unembossed portion of fuel element 10 by opposing peripheral beveled portions of rollers 41 to push the fuel rod through the embossing machine. Various other longitudinal feed means may also be employed, e.g., hydraulic plunger, air cylinder, etc. Shafts 42 and driving rollers 41 are driven by a power source (not shown) which is variable in speed to allow for different feed rates to be correlated with the rotational speed of counter-rotating tool holders 50a and 50b and the pitch angle of male die wheels 20a, 20b, to determine the pitch angle of the embossed grooves.

Figure 3:
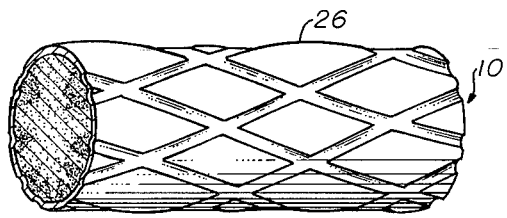
FIGURES 3 through 6 are several examples of variously embossed fuel elements produced by the method of manufacture of this invention.

FIGURES 3 through 6 are examples illustrative of the variation in pattern obtainable through the process of this invention. FIGURE 3 is an example of a fuel element having steep opposing helixes wherein the angles $\alpha$ and $-\alpha$, made by the axes 21a and 21b of male die wheels 20a and 20b with the longitudinal axis of fuel element 10, is approximately 60 degrees.

Figure 4:
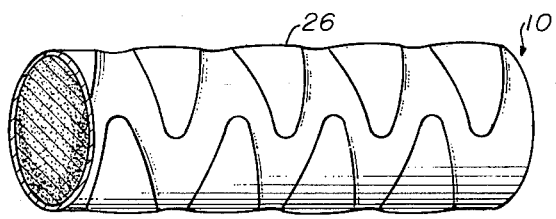

FIGURE 4 is an example of a fuel element having flat opposing helixes where angle $\alpha$ is approximately 30 degrees.

Figure 5:
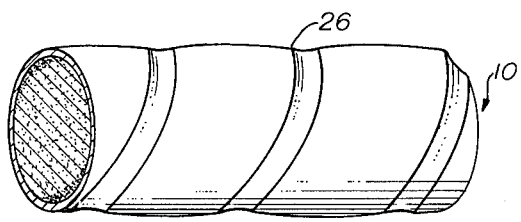

FIGURE 5 is an example of a fuel element having a single helix produced by one male die wheel where angle $\alpha$ is approximately 60 degrees.

Figure 6:
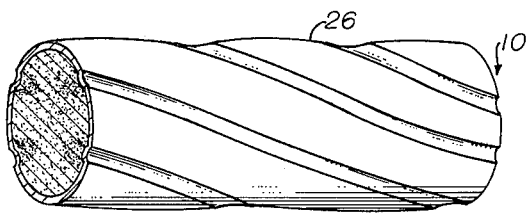

FIGURE 6 is an example of a fuel element having a set of single helixes produced by several die wheels rotating in the same direction where angle $\alpha$ is approximately 30 degrees.

Although the foregoing embodiment has been described in detail, there are obviously many other embodiments and variations in configuration which can be made by a person skilled in the art without departing from the spirit, scope, or principle of this invention. Therefore, this invention is not to be limited except in accordance with the scope of the appended claims.

What is claimed is:

1. In a method for manufacturing an embossed fuel element for a nuclear reactor the steps comprising filling a thin-walled metallic tube with fissile fuel material, compacting said fissile fuel to a medium density and then applying narrow local compression force means progressively along the surface of said fissile fuel filled tube to deform said tube inwardly to further compress said fissile fuel in the region of said narrow local compressive force to generate a narrow helical groove along said tube and to simultaneously deform said tube outwardly in regions supported only by fissile fuel between successive turns of said narrow grooves to produce an embossed outwardly deformed area between successive narrow grooves.

2. In a method for manufacturing an embossed fuel element for a nuclear reactor the steps comprising filling a thin-walled ductile metal tube with fissile fuel material compacting said fissile fuel material to a medium density and then applying serially in a helical path along the longitudinal axis of said tube two sets of narrow local compressive force means progressively along the surface of said fissile fuel filled tube to deform said tube inwardly to further compress said fissile fuel in the region said narrow local compressive forces to generate opposing narrow helical grooves along said tube and to simultaneously deform said tube outwardly in regions supported only by fissile fuel between successive turns of said narrow grooves to produce embossed outwardly deformed areas between successive narrow grooves.

3. In a method for manufacturing an embossed fuel element for a nuclear reactor the steps comprising filling a thin-walled ductile metal tube with fissile fuel material, compacting said fissile fuel material to a medium density and then applying narrow rolling wheel male dies forceably against the surface of said fissile fuel filled tube in a helical path to deform said tube inwardly compressing said fissile fuel and generating a narrow helical groove along said tube and simultaneously deforming said tube outwardly in regions supported only by fissile fuel between successive turns of said narrow grooves to produce embossed outwardly deformed areas between successive narrow grooves.

4. In a method for manufacturing an embossed fuel element for a nuclear reactor the steps comprising filling a thin-walled ductile metal tubing made from an alloy selected from the group stainless steel and zirconium with fissile fuel material, compacting said fissile fuel to a medium density and then applying narrow rolling wheel male dies forceably against the surface of said tube and serially along and rotationally about the longitudinal axis of said tube, deforming said tube and inwardly compressing said fissile fuel generating narrow opposing helical grooves along said tube and simultaneously deforming said tube outwardly in regions supported only by fissile fuel between successive turns of said narrow grooves to produce embossed outwardly deformed areas between successive narrow grooves.

5. In a method for manufacturing embossed fuel elements for a nuclear reactor the steps comprising filling a thin-walled ductile metal tube made from an alloy material selected from the group stainless steel and zirconium with fissile fuel material, compacting said fissile fuel to a medium density, and then applying forceably against the surface of said tube and serially along and rotationally about the longitudinal axis of said tube two sets of several narrow rolling wheel male dies each set distributed equa-angularly about said tube, inwardly compressing and deforming said fissile fuel and ductile metallic tube to generate multiple narrow helical grooves along said tube and simultaneously deform said tube outwardly in regions supported only by fissile fuel between successive turns of said narrow helical grooves to produce embossed outwardly deformed areas between successive narrow helical grooves.

6. A fuel element for a nuclear reactor comprising a powdered fissile fuel material, and a thin ductile tubular metallic cladding encasing said fuel material, said cladding having depressed narrow helical linear regions penetrating into said fuel with outwardly deformed regions supported only by fissile fuel between said depressed narrow linear regions, said fissile fuel material being selectively compacted beneath said depressed cladding areas through simultaneous compression of both cladding and fissile fuel material to form a matrix of compacted narrow helical linear regions within said fuel.

References Cited by the Examiner

UNITED STATES PATENTS

| | | | |
|---|---|---|---|
| 2,863,818 | 12/1958 | Smith et al. | 176—67 |
| 2,941,933 | 6/1960 | Roake et al. | 29—422 X |
| 2,983,660 | 5/1961 | Loeb et al. | 29—420.5 |
| 3,031,392 | 4/1962 | Ida et al. | 176—67 |
| 3,139,681 | 7/1964 | Goslee et al. | 29—474.3 |
| 3,177,578 | 4/1965 | Barr | 29—474.3 |

LEON D. ROSDOL, *Primary Examiner.*

L. DEWAYNE RUTLEDGE, BENJAMIN R. PADGETT, *Examiners.*

M. J. SCOLNICK, *Assistant Examiner.*